United States Patent [19]

Hall

[11] Patent Number: 4,531,263
[45] Date of Patent: Jul. 30, 1985

[54] GUY ATTACHING DEVICE FOR ATTACHMENT TO A UTILITY LINE POLE

[76] Inventor: Gaddis G. Hall, P.O. Box 6699, Birmingham, Ala. 35210

[21] Appl. No.: 602,017

[22] Filed: Apr. 19, 1984

[51] Int. Cl.³ ............................................. F16I 3/06
[52] U.S. Cl. ............................... 24/115 K; 24/115 R; 248/63; 248/65
[58] Field of Search ............. 24/115 A, 115 J, 115 K, 24/115 L; 248/219.3, 65, 63, 66, 67.5, 67.7; 52/146, 148; 403/405; 256/62, 63

[56] References Cited

U.S. PATENT DOCUMENTS

| | | | |
|---|---|---|---|
| 2,106,305 | 1/1938 | Pittman | 248/65 |
| 2,274,528 | 2/1942 | Chance | 24/115 K |
| 2,643,428 | 6/1953 | Jenne | 248/65 X |
| 2,983,010 | 5/1961 | Huggins | 24/115 K |
| 3,026,368 | 3/1962 | Lindsey | 248/63 X |
| 3,561,708 | 2/1971 | Dubey et al. | 248/63 |

FOREIGN PATENT DOCUMENTS 484444 7/1952 Canada .................................. 248/65

Primary Examiner—William E. Lyddane
Assistant Examiner—L. K. Cranmer
Attorney, Agent, or Firm—Woodford R. Thompson, Jr.

[57] ABSTRACT

A guy attaching device embodies a body having an upper hub with a horizontal passageway therethrough for receiving a bolt. A forward bearing surface on the hub engages the head of the bolt to align it with a horizontal hole through a pole. An upstanding neck at the forward end of the hub has a curved rear side which receives a loop of a guy and the upper end of the neck carries elongated, laterally tapering, mooring cleats. The rear end of the hub carries an annular projection which surrounds and extends perpendicular to the passageway through the hub in position to engage the adjacent surface of the pole. A depending pole engaging pad is carried by the body beneath the annular projection on the hub with the lower end of the pad being inclined forwardly and downwardly in position for its rear surface to engage the pole. At least one spur member is carried by the lower rear portion of the pad and has a sharp chisel edge which is elongated vertically.

16 Claims, 9 Drawing Figures

U.S. Patent   Jul. 30, 1985   4,531,263
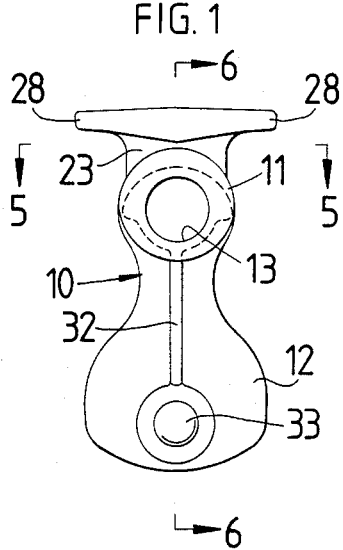
FIG. 1
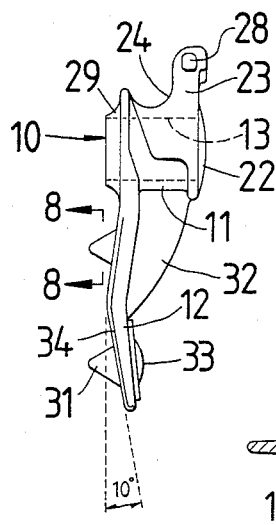
FIG. 2
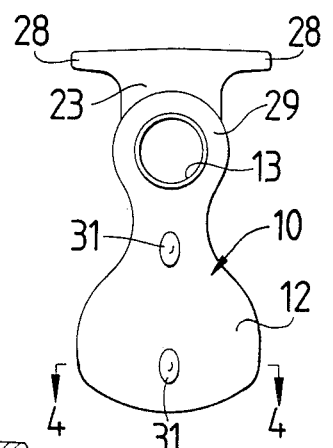
FIG. 3
FIG. 4
FIG. 5
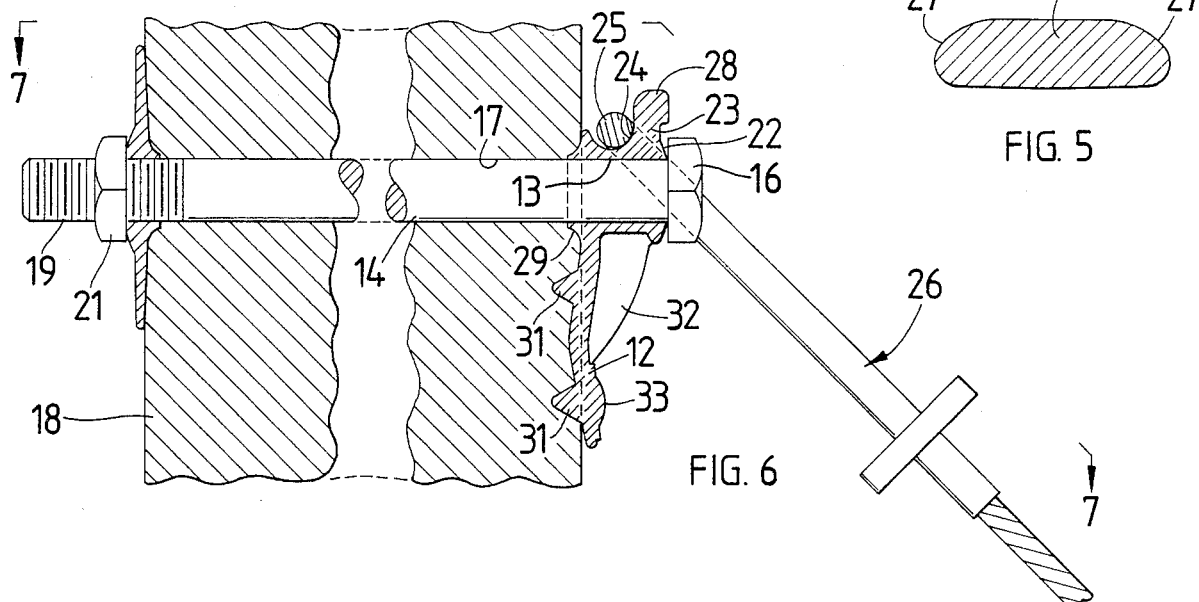
FIG. 6
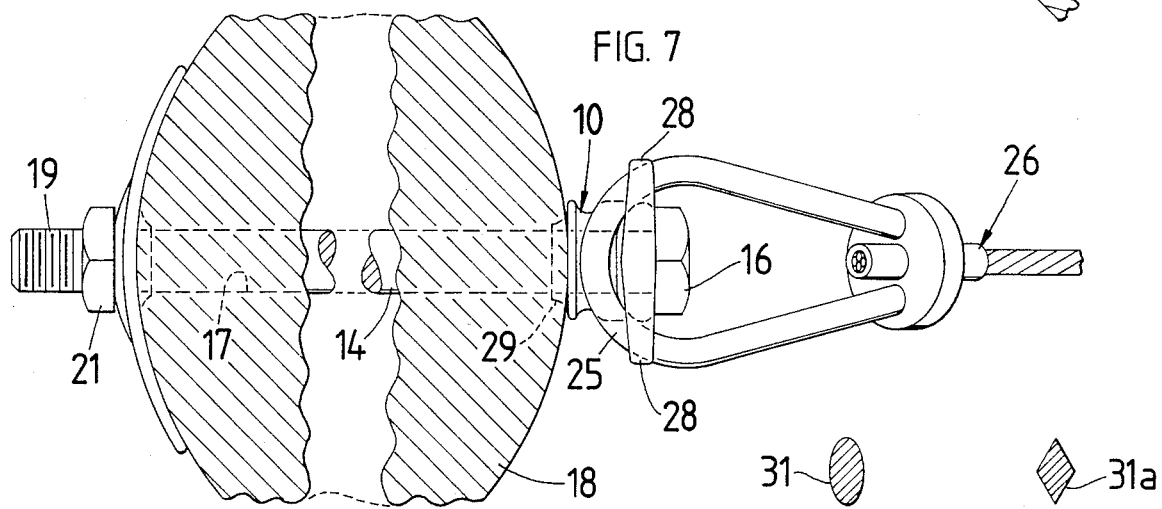
FIG. 7
FIG. 8  FIG. 9

GUY ATTACHING DEVICE FOR ATTACHMENT TO A UTILITY LINE POLE

BACKGROUND OF THE INVENTION

This invention relates to a guy attaching device for attachment to a utility line pole and more particularly to such a guy attaching device which is adapted for easy attachment of guy wires, cables or the like to wood poles without significant damage to the pole and at the same time allows increased working loads or cable tensions to be applied thereto over those possible with conventional guy attaching devices.

Heretofore in the art to which my invention relates, difficulties have been encountered with conventional guy attaching devices due to the fact that, when the retaining bolt is torqued, there is insufficient face area on the guy attaching device to resist the pressure applied therethrough to the pole whereby the device is drawn into the pole, thus making it difficult to assemble a guy loop on the device. That is, the neck clearance on such conventional guy attaching devices is not maintained constant relative to the pole bearing face whereby upon tightening the mounting bolt to its maximum preload, it is difficult to attach the guy loop. Also, since conventional guy attaching devices are drawn into the pole upon tightening the mounting bolt, this increases downslotting of the mounting bolt which results in pole damage and permits rain water to enter the pole and thus cause accelerated internal age deterioration and rot of the pole.

Prior art type guy attaching devices also permit substantial damage to the pole face under high working loads due to the fact that under such high working loads the device rotates relative to the pole, thus forcing the leading or bottom edge of the device into the pole whereby the wood fibers are sheared and damaged. Prior art type apparatus mentioned above is shown in the Jenne Pat. No. 2,901,798, dated Sept. 1, 1959, and the Huggins Pat. No. 2,983,010, dated May 9, 1961.

BRIEF SUMMARY OF INVENTION

To overcome the above and other difficulties, I provide a guy attaching device which is adapted for easy attachment of guy wires, cables or the like to wood poles with a minimum of damage to the pole and at the same time working loads or cable tensions may be increased substantially over those possible with prior art devices.

Briefly, my improved guy attaching device embodies a body member having an upper hub portion with a horizontal passageway therethrough for receiving a through bolt provided with the usual retaining head, nut or the like. A forward bearing surface on the hub portion surrounds the forward end of the horizontal passageway in position to engage the retaining head on the bolt whereby it is aligned with the horizontal opening through the pole. An upstanding neck is formed integrally with the forward end of the hub portion and is provided with a curved rear side in position to receive a loop of a guy member. An annular projection at the rear end of the hub portion surrounds and extends perpendicular to the passageway through the hub portion in position to engage the adjacent surface of the pole surrounding the opening therethrough to limit inward movement of the device into the pole. A depending pole engaging pad-like member is carried by the body member beneath the annular projection on the hub portion with the lower portion of the pad-like member being inclined forwardly and downwardly in position for its rear surface to engage the adjacent surface of the pole and maintain full area contact of the pad-like member with the adjacent surface of the pole at maximum working loads. At least one spur-like member is carried by the lower, rear surface of the pad-like member and has a sharp chisel edge which is elongated vertically, as viewed in cross section. Elongated, laterally extending mooring cleats are carried by the upper end of the neck portion of the device with each cleat being tapered away from the vertical center of its neck portion.

DESCRIPTION OF THE DRAWING

A guy attaching device embodying features of my invention is shown in the accompanying drawing, forming a part of this application, in which:

FIG. 1 is a front elevational view of the guy attaching device;

FIG. 2 is a side elevational view thereof;

FIG. 3 is a rear elevational view thereof;

FIG. 4 is a sectional view taken generally along the line 4—4 of FIG. 3;

FIG. 5 is an enlarged, sectional view taken generally along the line 5—5 of FIG. 1;

FIG. 6 is an enlarged, sectional view taken generally along the line 6—6 of FIG. 1, partly broken away and showing my improved guy attaching device attached to a utility line pole;

FIG. 7 is a sectional view taken generally along the line 7—7 of FIG. 6;

FIG. 8 is a sectional view taken generally along the line 8—8 of FIG. 2 showing the cross sectional shape of a spur-like member; and, FIG. 9 is a sectional view corresponding to FIG. 8 but showing a modified form of spur-like member.

DETAILED DESCRIPTION

Referring now to the drawing for a better understanding of my invention, I show my improved guy attaching device as embodying a body member 10 having an upper hub portion 11 and a depending pole engaging pad-like member 12. The hub portion 11 is provided with a generally horizontal passageway 13 therethrough for receiving a through bolt 14 provided with a retaining head, nut or the like 16, as shown. As shown in FIGS. 6 and 7, the through bolt 14 is adapted to extend through a horizontal opening 17 provided through a utility line pole 18 in the usual manner. The end of the through bolt 14 opposite the head 16 is provided with a threaded portion 19 which is adapted to receive a retaining element, such as a nut 21.

As clearly shown in FIG. 6, the forward end of the hub portion 11 is provided with a forward bearing surface 22 which surrounds the forward end of the passageway 13 in position to engage the head 16 of the through bolt 14. The forward bearing surface 22 on the hub portion 11 is in the form of an annular segment of a sphere which defines a bearing face that engages the head 16 of the through bolt 14 so that it is aligned with the horizontal opening 17 through the pole 18.

Formed integrally with the hub portion 11 adjacent the forward end of the passageway 13 is an upstanding neck portion 23 having a convexly curved rearward side 24, as viewed in cross section which is in position to receive a loop 25 or the like of a guy member indicated generally at 26 in FIGS. 6 and 7. As shown in FIG. 5, the neck portion 23 is provided with arcuate lateral edge portions 27, each of such edge portions being struck on a large radius of a length to eliminate high stress points and thus maintain full loop strength of the guy member at various guy angles. That is, my improved multiple radius design minimizes guy and/or preformed cable loop stresses due to the fact that the larger radius at the lateral edges of the neck portion 23 maintains full loop strength with misaligned guy angles by eliminating high stress points. The top of the neck portion 23 terminates at an elevation to permit guying at and above an included angle of 90° relative to the face of the pole 18. Also, the neck portion 23 is adapted to accommodate a guy loop, preformed cabled guy grips or solid bail of an automatic guy attachment.

The upper end of the neck portion 23 carries laterally extending mooring cleats 28 which are tapered away from the vertical center of the neck portion 23, as shown in FIGS. 1 and 3. In actual practice, I have found that by so constructing and arranging the mooring cleats 28, I obtain the most efficient use of the metal in the attaching device due to the fact that the outer ends of the cleats 28 only retain the loop of the guy member in place before it is tensioned. After the loop 25 of the guy member is drawn in tight against the neck portion 23, the loop diameter is reduced to conform around the neck portion 23 whereby the tapered ends of the cleats become non-functional. Also, my improved tapered cleats greatly facilitate the installation of the loop of the guy member about the neck portion 23 since it is unnecessary to manually force fit a loop under depending ear-like members, such as are provided on conventional guy hooks.

As shown in FIGS. 2, 3, 6 and 7, an annular projection 29 is provided at the rear end of the hub portion 11 in position to surround the rear end of the passageway 13. The annular projection 29 is positioned in spaced relation to the neck portion 23 and extends generally perpendicularly to the passageway 13 in position to engage the adjacent surface of the pole 18 surrounding the horizontal opening 17 to thus limit inward movement of the device into the pole whereby a constant clearance is maintained between the adjacent surface of the pole 18 and the neck portion 23. That is, the annular bearing face 29 surrounding the adjacent end of the bolt hole 17 and contacting the face of the pole prevents the device from being drawn into the pole as the bolt is torqued. Accordingly, the neck clearance with my improved design relative to the pole is maintained constant thus permitting the mounting bolt 14 to be torqued to its maximum preload which minimizes down-slotting of the bolt and resulting pole damage. As clearly shown in FIG. 6, the pole engaging side of the annular projection 29 is tapered inwardly and rearwardly toward the rear end of the passageway 13 through the hub portion to thus form a seal between the annular projection 29 and the horizontal opening 17 through the pole, thus preventing rainwater from entering the pole and causing accelerated internal age deterioration and rot of the pole.

The depending pad-like member 12 is formed integrally with the rear end of the hub portion 11 with the lower portion thereof being inclined forwardly and downwardly in position for the rear surface thereof to engage the adjacent surface of the pole 18 and maintain full area contact of the pad-like member 12 with the adjacent surface of the pole at maximum working loads. Accordingly, the inclined lower portion of the pad-like member eliminates damage to the pole face under high working loads. In actual practice, I find that my improved guy attaching device is satisfactory in every respect where the pad-like member 12 is inclined forwardly and downwardly relative to the adjacent surface of the pole 18 to define an included angle ranging from approximately 5° to 15°. Preferably, the pad-like member 12 is inclined forwardly and downwardly relative to the adjacent surface of the pole to define an included angle of approximately 10°. Preferably, the lower inclined portion of the pad-like member also constitutes a major portion of the pad-like member. The provision of my improved pole engaging pad-like member allows for full downslotting and bending of the bolt 14 at its exit from the pole face without rotating and forcing the leading or bottom edge of the pad-like member into the pole, thereby preventing shearing and damaging the wood fibers of the pole. Accordingly, my improved pad-like member positively controls any pressure on the pole face so that as greater pressure is applied to the guy wire, the greater the area of contact with the pole, thus reducing the pressure per square inch applied to the pole.

As shown in FIGS. 2, 3, 4 and 6, rearwardly projecting spur-like members 31 are carried by the rear surface of the pad-like member. Each spur-like member has a sharp chisel edge which is elongated vertically and moves downwardly within the pole in response to application of a guy load without severing and disrupting the adjacent fiber structure of the pole. Preferably, each spur-like member 31 has a vertically oriented cross sectional shape with a length to width ratio ranging from approximately 2:1 to 3:1. Also, it is preferred that at least one of the spur-like members be positioned adjacent the lower edge of the pad-like member to increase its moment arm from the through bolt 14 to provide a minimum size spur-like member 31 consistent with rotational stability under side loadings.

The horizontal passageway 13 through the hub portion 11 is of a size to support uniformly the full engaged length of the through bolt 14 to assure proper alignment and seating by through bolt pressure without forcing alignment with a hammer or the like. The combined effect of the length of the hole 13 through the hub portion and the clearance insures proper positioning and utilizes the bending strength of the bolt to minimize downslotting and pole damage. Preferably, the clearance for a hole that will effectively perform with both ⅝ inch and ¾ inch diameter bolts has been determined to be within a range of from approximately 0.770 inch to 0.843 inch in diameter and the engagement length of the bolt with the hole ranges from approximately 8.75 inch to 1.750 inches.

As shown in FIGS. 1, 2 and 6, a vertically extending reinforcing rib 32 is formed integrally with and extends between the upper hub portion 11 and the forward side of the depending pad-like member 12 so as to provide reduced weight and add strength to my improved guy attaching device. Also, a protrusion button-like member 33 may be located below the rib 32 on the pad-like member 12 to provide a hammer strike location. The diameter of the protrusiton 33 is such as to permit a 9/16 inch hole to be punched or drilled out over the protrusion for a ½ inch lag screw, or the like, which may be employed to provide additional resistance to downslotting.

Preferably, the rear side of the lower portion of the pad-like member 12 tapers laterally from its vertical center line as shown at 34 in FIG. 2. That is, the lower portion of the pad-like member 12 tapers horizontally away from its vertical center line in order to provide adequate bearing pressure when the guy is installed at an angle off of the center plane of the guy attaching device and the pole. This permits the guy attachment device to roll to one side where there is support area, rather than roll onto a sharp edge. This structure also minimizes pole damage and permits a greater loading.

While I have shown the spur-like member 31 as being of a general oval shape in FIGS. 3 and 8, it will be apparent that the spur-like members may be of other shapes which will suggest themselves to one skilled in the art to which my invention relates. For example, the spur-like member could be of a generally diamond shape, as shown at 31a in FIG. 9.

From the foregoing, it will be seen that I have devised an improved guy attaching device for attachment to a utility line pole which provides for easy attachment of guy wires or cables to wood poles with a minimum of damage to the pole and at the same time permits increased working loads or cable tensions over those possible with conventional guy attachment devices.

While I have shown my invention in two forms, it will be obvious to those skilled in the art that it is not so limited, but is susceptible of various other changes and modifications without departing from the spirit thereof.

What I claim is:

1. In a guy attaching device for attachment to a utility line pole and the like having a horizontal opening therethrough comprising:
   (a) a body member having an upper hub portion with a generally horizontal passageway therethrough for receiving a throughbolt provided with a retaining head, nut or the like,
   (b) a forward bearing surface on said hub portion surrounding the forward end of said passageway in position to engage said head, nut or the like,
   (c) an upstanding neck portion formed integrally with said hub portion adjacent said forward end of said passageway and having a convexly curved rearward side as viewed in horizontal cross section in position to receive a loop of a guy member,
   (d) a generally annular projection on said hub portion surrounding the rear end of said passageway in spaced relation to said neck portion and extending generally perpendicular to said passageway in position to engage the adjacent surface of the pole surrounding said horizontal opening therethrough to limit inward movement of said device into the pole and maintain a constant clearance between the adjacent surface of the pole and said neck portion and
   (e) a depending pole engaging pad-like member carried by said body member beneath said generally annular projection on said hub portion with a lower portion of said pad-like member being inclined forwardly and downwardly in position for the rear surface thereof to engage the adjacent surface of the pole and maintain full area contact of said pad-like member with said adjacent surface of the pole at maximum working loads.

2. A guy attaching device as defined in claim 1 in which said forward bearing surface on said hub portion is in the form of an annular segment of a sphere which defines a bearing face that aligns said retaining head, nut or the like with said horizontal opening through the pole.

3. A guy attaching device as defined in claim 1 in which the pole engaging side of said annular projection on said hub portion is tapered inwardly and rearwardly toward said rear end of said passageway to form a seal between said annular projection and said horizontal opening through the pole.

4. A guy attaching device as defined in claim 1 in which said lower portion of said pad-like member is inclined forwardly and downwardly relative to the adjacent surface of the pole to define an included angle ranging from approximately 5 degrees to 15 degrees.

5. A guy attaching device as defined in claim 1 in which said lower portion of said pad-like member is inclined forwardly and downwardly relative to the adjacent surface of the pole to define an included angle of approximately 10 degrees.

6. A guy attaching device as defined in claim 1 in which said lower portion of said pad-like member constitutes a major portion of said pad-like member.

7. A guy attaching device as defined in claim 1 in which said neck portion has arcuate lateral edges with each being struck on a large radius of a length to eliminate high stress points and thus maintain full loop strength of the guy member at various guy angles.

8. A guy attaching device as defined in claim 7 in which the upper end of said neck portion carries elongated, laterally extending mooring cleats that are tapered away from the center of said neck portion.

9. A guy attaching device as defined in claim 8 in which the upper end of said neck portion terminates at an elevation to permit guying at and above an included angle of 90 degrees relative to the face of the pole.

10. A guy attaching device as defined in claim 1 in which at least one rearwardly projecting spur-like member is carried by the rear surface of said lower portion of said pad-like member with said spur-like member having a sharp chisel edge which is elongated vertically and moves downwardly within the pole in response to application of a guy load without severing and disrupting the adjacent fiber structure of the pole.

11. A guy attaching device as defined in claim 10 in which said spur-like member has a vertically oriented cross sectional shape with a length to width ratio ranging from 2:1 to 3:1 and is positioned adjacent the lower edge of said pad-like member to increase its moment arm from said throughbolt to provide a minimum size spur-like member consistant with rotational stability under side loadings.

12. A guy attaching device as defined in claim 1 in which said horizontal passageway through said hub portion is of a size to support uniformly the full engaged length of said throughbolt to assure proper alignment and seating by throughbolt pressure.

13. A guy attaching device as defined in claim 12 in which the preferred clearance between said horizontal passageway and a throughbolt having a diameter of from $\frac{5}{8}$ inch to $\frac{3}{4}$ inch is obtained with a horizontal passageway ranging from approximately 0.770 inch to 0.843 inch in diameter and the engagement length therebetween ranges from approximately 0.875 inch to 1.750 inches.

14. A guy attaching device as defined in claim 1 in which a vertically extending reinforcing rib is formed integrally with and extends between said upper hub portion and the forward side of said depending pad-like member.

15. A guy attaching device as defined in claim 14 in which a hole is provided through said pad-like member beneath said reinforcing rib for receiving a retaining screw.

16. In a guy attaching device for attachment to a utility line pole and the like having a horizontal opening therethrough comprising:
(a) a body member having an upper hub portion with a generally horizontal passageway therethrough for receiving a throughbolt provided with a retaining head, nut or the like,
(b) a forward bearing surface on said hub portion surrounding the forward end of said passageway in position to engage said head, nut or the like,
(c) an upstanding neck portion formed integrally with said hub portion adjacent said forward end of said passageway and having a convexly curved rearward side as viewed in horizontal cross section in position to receive a loop of a guy member,
(d) a generally annular projection on said hub portion surrounding the rear end of said passageway in spaced relation to said neck portion and extending generally perpendicular to said passageway in position to engage the adjacent surface of the pole surrounding said horizontal opening therethrough to limit inward movement of said device into the pole and maintain a constant clearance between the adjacent surface of the pole and said neck portion, and
(e) a depending pole engaging pad-like member carried by said body member beneath said generally annular projection on said hub portion with a lower portion of said pad-like member being inclined forwardly and downwardly in position for the rear surface thereof to engage the adjacent surface of the pole and maintain full area contact of said pad-like member with said adjacent surface of the pole at maximum working loads with the rear surface of said lower portion of said pad-like member tapering laterally from its vertical center line.

* * * * *